(12) United States Patent
Nicholson

(10) Patent No.: US 9,132,965 B1
(45) Date of Patent: Sep. 15, 2015

(54) IDLER CONTROL SYSTEM FOR A CABLE CONVEYOR

(71) Applicant: Intraco, Inc., Oskaloosa, IA (US)

(72) Inventor: Eric L. Nicholson, Oskaloosa, IA (US)

(73) Assignee: INTRACO, INC., Oskaloosa, IA (US)

( * ) Notice: Subject to any disclaimer, the term of this patent is extended or adjusted under 35 U.S.C. 154(b) by 0 days.

(21) Appl. No.: 14/290,229

(22) Filed: May 29, 2014

(51) Int. Cl.
*B65G 23/44* (2006.01)
*B65G 19/14* (2006.01)
*B65G 65/02* (2006.01)

(52) U.S. Cl.
CPC ...................................... *B65G 23/44* (2013.01)

(58) Field of Classification Search
None
See application file for complete search history.

(56) References Cited

U.S. PATENT DOCUMENTS

| | | | |
|---|---|---|---|
| 3,962,996 A | 6/1976 | Jones | |
| 4,031,857 A | 6/1977 | Jones | |
| 4,071,136 A | 1/1978 | Jones | |
| 4,195,725 A | 4/1980 | Jones | |
| 4,197,938 A | 4/1980 | Klinkenberg | |
| 4,234,073 A * | 11/1980 | Satterwhite | 198/304 |
| 5,097,797 A | 3/1992 | Van Zee | |
| 5,205,416 A | 4/1993 | Van Zee | |
| 7,267,218 B1 | 9/2007 | Van Zee | |

\* cited by examiner

*Primary Examiner* — Kavel Singh
(74) *Attorney, Agent, or Firm* — Sturm & Fix LLP

(57) ABSTRACT

An improvement to cable conveyor system using a pneumatic cylinder system for keeping a cable tight is provided for preventing damage to the system if the cable stretches/fails or is too loose. The fluid cylinder/piston applies a force on the cable proportionate to the pressure that is regulated to the cylinder during normal operation of the cable conveyor system. The relative position of a magnetic switch and a magnet on a piston in the cylinder, provides a way to sense a lack of tension in the cable and shut the system down before damage is done to the conveyor. Likewise, if the cable stretches or fails, a carriage having an idler thereon, will move close enough to a proximity switch to cause the proximity switch to shut down the system.

8 Claims, 5 Drawing Sheets

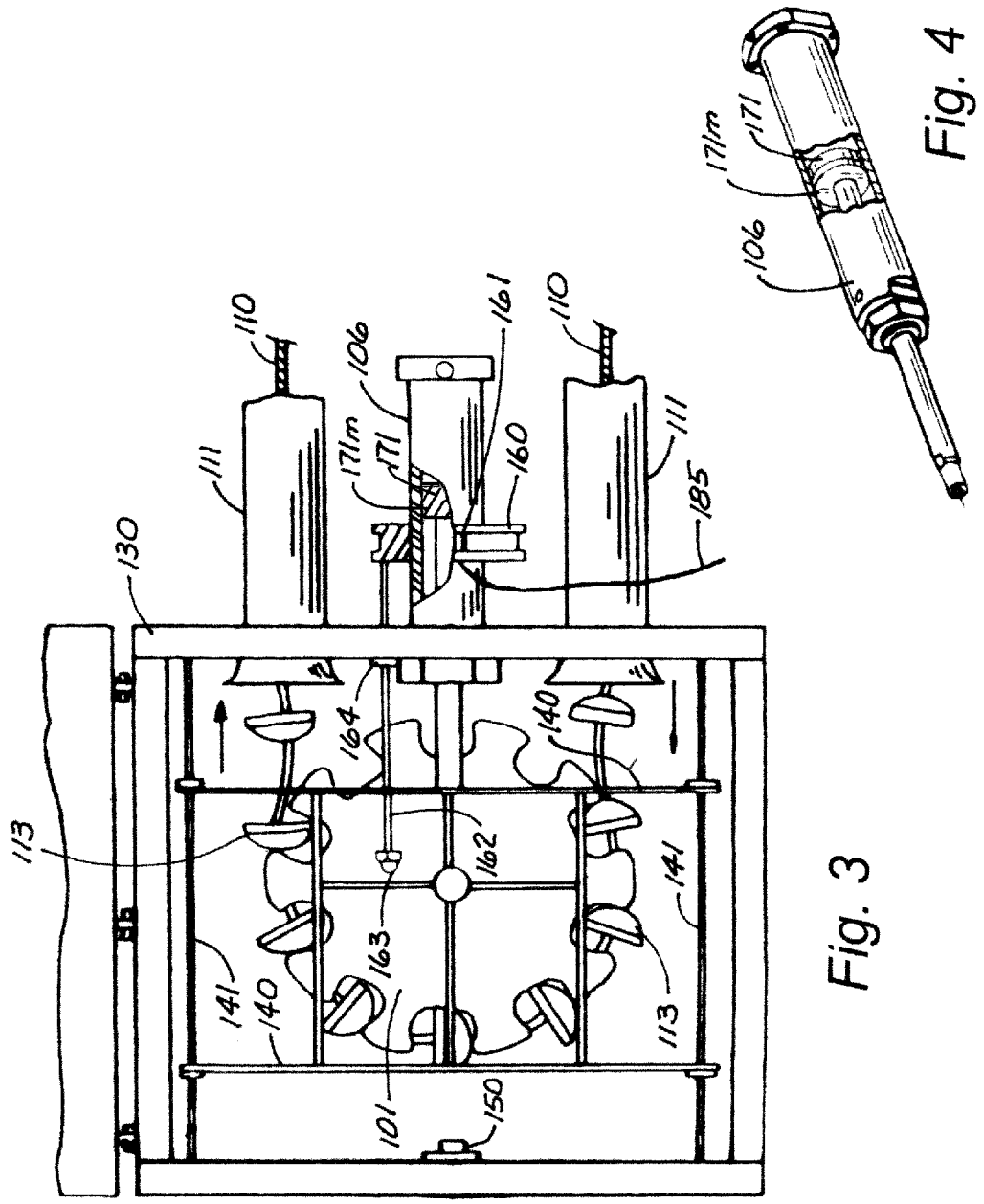

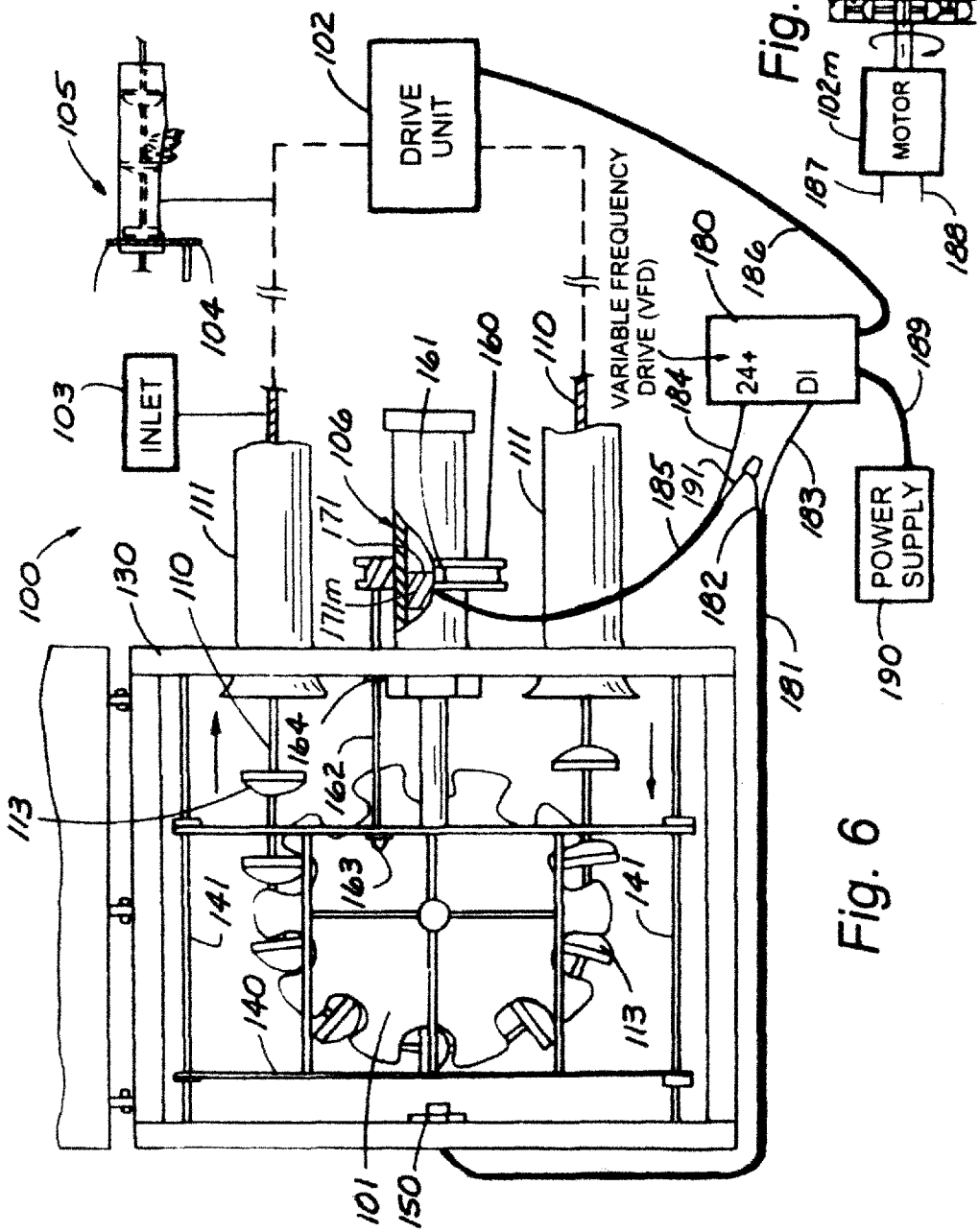

US 9,132,965 B1

IDLER CONTROL SYSTEM FOR A CABLE CONVEYOR

TECHNICAL FIELD

The present invention is an improvement to a cable conveyor system of a type using a pneumatic cylinder system for keeping a cable in an acceptable range of tension. A mechanism is provided to shut off the conveyor system to prevent damage to it if the cable stretches/fails or is too loose.

BACKGROUND

Cable conveyors of the type shown generally in cable conveyor systems have been in use for decades. These cable conveyor systems use an endless loop tubular system extended to remote locations and then end up back where they started. This could be compared to, or can be similar to, a tube that is circular, for example like a hollow round hula hoop, but the tube itself usually takes a winding path (for example as shown in U.S. Pat. No. 4,197,938 to Klinkenberg) and the tubular system has structural differences at the corners where it makes turns. It also has other structural members attached to it, such as inlets, outlets (for example as shown in U.S. Pat. No. 4,031,857 to Jones), cable drive units (for example as shown in U.S. Pat. No. 4,195,725 to Jones), etc., all of which are well known in a general way in this art. The aforementioned patents are hereby incorporated by reference in their entirety.

For the purposes of this document, "endless loop" is defined herein as a somewhat endless track or circuit. In the case of an endless loop tubular system it starts out at one point, extends to wherever else it is designed to go, and then ends up back at that one starting point again.

These aforementioned endless loop tubular systems also have an endless loop flexible member inside with the ends thereof attached to each other to form a "circuit" within the endless loop tubular system. These endless loop flexible members are typically cables, but "endless loop flexible members" can include chains, ropes, or the like. The endless loop flexible member has inserts or discs on them such as those shown on the cables of the aforementioned U.S. patents. The endless loop tubular systems can, for example, wind through a building to have outlets wherever the user may wish to deliver the product being conveyed, there being an unlimited possibility of shapes of the endless loop tubular system and virtually an unlimited number of outlet opening locations for selectively delivering the material being conveyed to wherever desired.

One of the few problems associated with such a cable conveyor system is keeping a proper tension on the cable. If the cable has stretched/failed or become too loose, the system can fail and damage some of the parts of the system.

Accordingly, there is a need for a way to shut down a cable conveyor system when the cable has stretched/failed or become too loose.

SUMMARY OF THE INVENTION

A fluid cylinder/piston applies a force on the cable proportionate to the pressure that is regulated to the cylinder during normal operation of the cable conveyor system. The relative position of a magnetic switch and a magnet on the piston in the cylinder provides a way to sense a lack of tension in the cable and shut the system down before damage is done to the conveyor. Likewise, if the cable stretches or fails, a carriage having an idler thereon, will move close enough to a proximity switch to cause the proximity switch to shut down the system.

BRIEF DESCRIPTION OF THE DRAWINGS

The above identified problem is at least partially solved through provision of the apparatus described in the following detailed description, particularly when studied in conjunction with the drawings, wherein:

FIG. 3 is a view like FIG. 2, but showing the carriage and idler moved to the right and showing that the cable is too loose;

FIG. 4 is a perspective view of a pneumatic cylinder that is also shown in FIGS. 1-3 and 6 with a portion of the cylinder broken away to show a piston inside of the cylinder with a magnet attached to the piston within the cylinder;

FIG. 6 is a view like FIG. 1, but also showing schematically a drive unit and a circuit that turns off a drive unit motor when the cable stretches/fails or becomes too loose; and FIG. 7 is a side view of the most important parts of the drive unit, including a drive pulley with the cable with inserts on it and a variable frequency (speed) electrical motor to turn the drive pulley.

Figure 1:
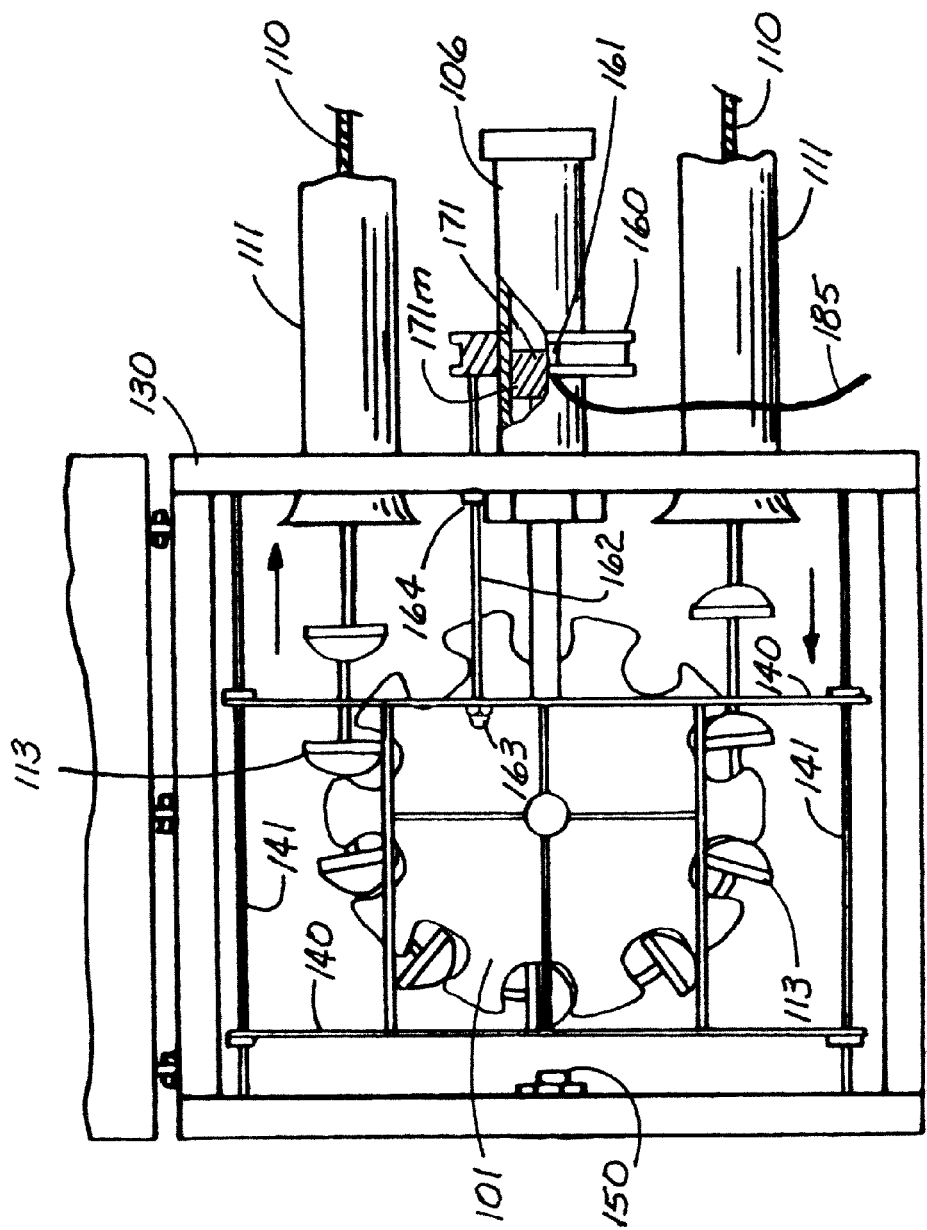
FIG. 1 is a view of an idler portion of a cable conveyor system constructed in accordance with the present invention showing a normal operating position of the idler with the cable being within an acceptable range of tightness.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Referring now to the drawings, wherein like reference numerals indicate identical or similar parts throughout the several views, FIGS. 1-7 show a preferred embodiment of the present invention 100. Looking to FIGS. 1 and 6, an idler 101 is in an operative position wherein the tightness of a cable 110 is neither failed or too loose.

Looking specifically to FIG. 6, the idler 101 is rotatably attached to a carriage 140 that is slideably attached to rods 141 on frame 130. A cable 110 has inserts/discs 113 rigidly attached thereto. The endless cable 110 is wrapped around the idler 101, and goes through the tubes 111 and through the drive unit 102.

FIG. 7 shows that the cable 110, with inserts 113 thereon, extends around drive pulley 101d, which drive pulley 101d is driven by a variable speed electric motor 102m. This permits the system to be used to convey material through the tubes 111, material that has been placed therein through an inlet 103. Outlets 105 can be attached to the tubes 111 where ever desired in order to deliver the material being conveyed to a final destination, for example as shown in U.S. patent application Ser. No. 14/199,475, to Nicholson, filed Mar. 6, 2014, which is incorporated herein by reference in its entirety. Outlet 105 can be opened or closed by rotating a gear 104 to engage the teeth of annular gear 112 on the outside of the outlet tube 105. Of course, the present invention is not limited to use of any particular type of outlet.

Figure 2:
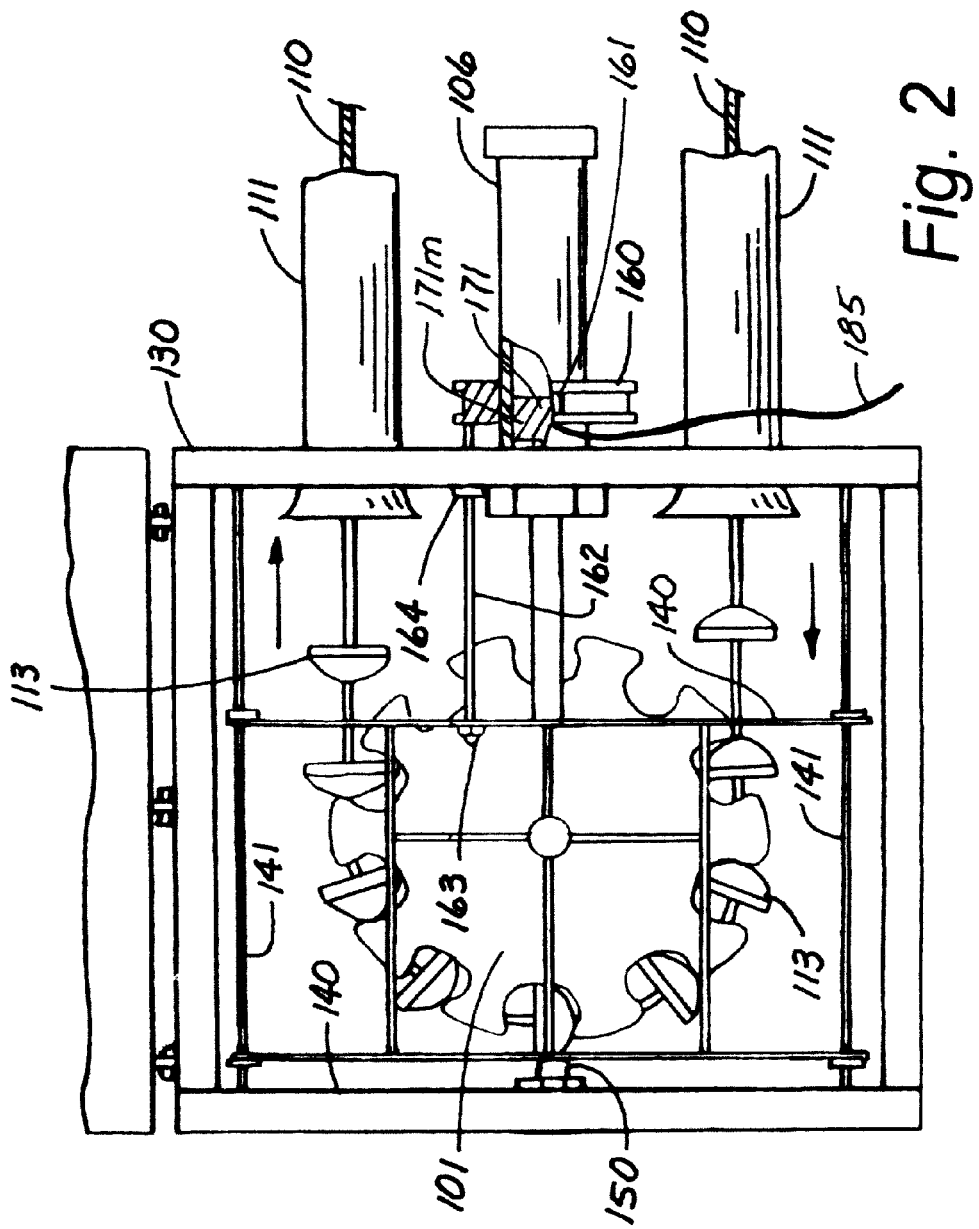
FIG. 2 is a view like FIG. 1, but showing a carriage and idler moved too far to the left indicating that the cable has stretched or failed.
Figure 5:
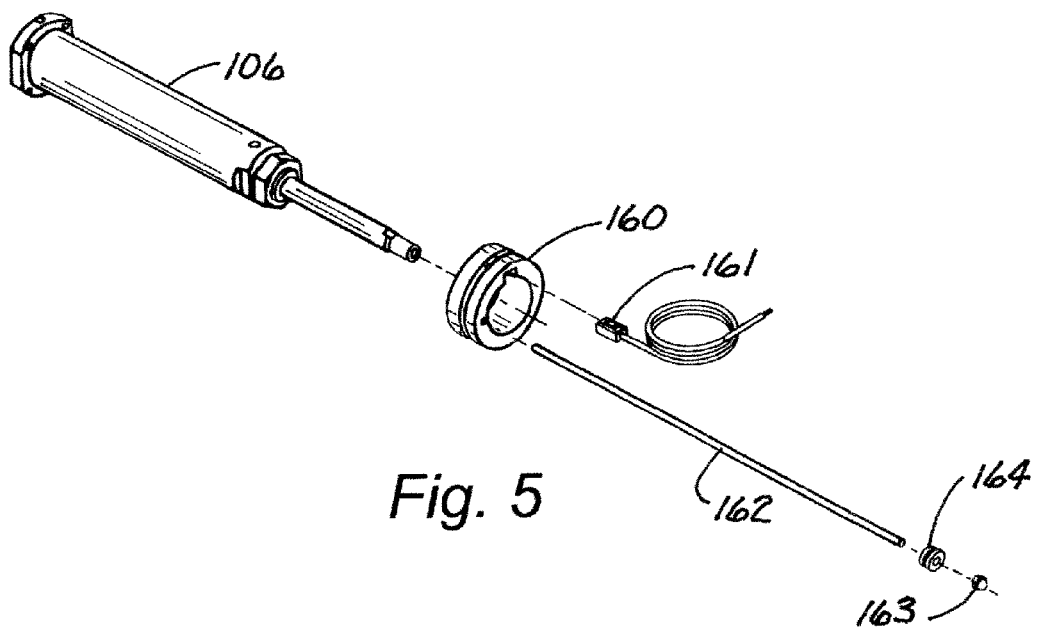
FIG. 5 is a perspective exploded view of the pneumatic cylinder, a sleeve that reciprocates on the outside of the cylinder, a magnetically operated reed valve that moves with the sleeve and a rod that attaches to the sleeve with an acorn nut that is threaded onto one end of the rod.

Pneumatic cylinder 106 applies a force on the cable 110 proportionate to the pressure that is applied to the piston 171 inside the cylinder 106 as is previously known by those skilled in this art. If the cable 110 becomes stretched, or fails, as shown in FIG. 2, the carriage 140 will come close to, or touch, a normally closed proximity switch 150, which will turn off the electricity to motor 102m. The cable 110 can then be shortened or otherwise adjusted, for example at the place where the cable ends are connected together, for example in one of the ways shown in U.S. Pat. No. 7,267,218 to Van Zee et al., which patent is also incorporated herein by reference in its entirety.

Conversely, if the cable 110 becomes too loose, as shown in FIG. 3, a magnet 171m attached to piston 171 becomes close to normally closed magnetically operated reed valve 106, thereby opening the reed valve 106 and turning off the electrical power to motor 102m. Once the system is off, the system 100 can be inspected for suspect lack of tension, or otherwise adjusted. The motor 102m can then be turned back on to cause the system 100 to operate normally again as shown in FIGS. 1 and 6.

Power from VFD or Control Panel 180 is wired to positive 184 wire of reed switch 161. The reed switch's 161 negative wire 191 is wired in series to the positive wire 182 of the proximity switch 150. Negative wire 183 from proximity switch 150 is then wired back to a digital input of the VFD or Control Panel. Digital input is set up as an emergency stop, instantly halting motor movement.

Looking to FIG. 3, the sleeve 160, reed switch 161 and magnet 171m in piston 171 act to sense a lack of tension in the cable 110 and shut the power off of drive unit 102 via motor 102m before damage is done to the conveyor system 100. This is accomplished by the exact length of the rod 162 going from the sleeve 160, through the frame 130 opening where grommet 164 is located, through slip fit opening in 140 (see the acorn nut 163 on the end of rod 162) which naturally positions sleeve 160 in the correct location of reed switch 161. When carriage 140 moves to the right from the desired position the reed switch 161 opens which signals the motor 102m to be turned off.

The carriage 140 pulls the rod 162 where it needs to be when the carriage 140 moves to the left as shown in FIGS. 1 and 2. The rubber grommet 164 is of a size to frictionally apply drag to the rod 162 to prevent the rod 162, sleeve 160 and reed switch 161 from moving when the carriage 140 moves freely to the right as shown in the movement from FIG. 1 to FIG. 3, until the magnet 171m in piston 171 moves out of range of the reed switch 161. The switch 161 opens and turn the drive unit motor 102m off. The rod 162 slides in a hole in the carriage 140 inline with the grommet 164 location; that is so the rod 162 can pull the sleeve 160 to the left, from the FIG. 1 position to the FIG. 2 position, when the carriage hits the acorn nut, but, at the same time, the carriage 140 does not push the sleeve 160 to the right when the carriage 140 moves to the right as shown in movement of the carriage 140 from the FIG. 1 to the FIG. 3 positions.

Once the system has been shut off, due to moving of the carriage 140 to the FIG. 3 position, the length of the cable 110 is adjusted or system inspected for cause of lack of tension. Then the system is reset by hand by moving the carriage 140 from the FIG. 3 position to a normal operating position as shown in FIG. 1. After that, the motor 102m can be restarted and the system will continue to work normally until and unless the cable 110 again either stretches or fails or becomes too loose.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. An idler control apparatus for a cable conveyor system comprising:
    a frame;
    an endless loop tubular system operatively attached to the frame;
    an inlet attached to the endless loop tubular system for permitting material to be conveyed to be introduced into the endless loop tubular system;
    an endless loop flexible member;
    inserts disposed on the endless loop flexible member for moving material along the endless loop tubular system;
    a drive mechanism for rotatably turning a pulley attached to the drive motor about a first rotary axis to thereby cause the endless loop flexible member and inserts to move in at least one direction through the endless loop tubular system;
    a carriage;
    an idler, the idler being rotatably attached to the carriage about a second rotary axis;
    wherein the endless loop flexible member is disposed around the idler;
    the carriage being reciprocally attached to a frame, the carriage having at least a first operating position when the endless flexible loop is within an acceptable range of tightness, a second position when the endless flexible loop is too loose, and a third position when the endless flexible loop has stretched or failed;
    a fluid operated cylinder having a piston disposed therein for selectively exerting a force on the carriage, the piston also having a first, second and third position corresponding respectively to the first, second and third positions of the carriage;
    a drive unit motor for rotating the drive mechanism;
    an electrical circuit connecting the drive unit motor to an electrical power supply;
    the piston having a magnet attached thereto and the magnet having a magnetic field;
    a magnetically operated, normally open, switch disposed in the circuit; and
    the switch being beyond the magnetic field of the magnet when the piston is in the third position (FIG. 3) thereof, whereby the switch will be opened, thereby shutting off electricity to the drive unit motor.

2. The idler control apparatus for a cable conveyor system of claim 1 further comprising a normally closed proximity switch disposed in the electrical circuit operating the drive unit motor, said proximity switch being of a type to automatically move to an open position to shut off electrical power to the drive unit motor when the carriage is in the second position (FIG. 2) thereof.

3. The idler control apparatus for a cable conveyor system of claim 1 wherein the fluid operated cylinder applies the force on the carriage and thereby on the cable proportional to a pressure in the cylinder against the piston.

4. The idler control apparatus for a cable conveyor system of claim 1 comprising a sleeve slideably disposed around and on the cylinder;
the magnetically operated, normally open, switch being disposed on the sleeve.

5. The idler control apparatus for a cable conveyor system of claim 4 including a rod attached to the sleeve extending through a first opening in the frame and through a second opening in the carriage;
a carriage component having a first side closest to the cylinder and a second side spaced farther away from the cylinder; and
a stop member attached to the rod on the second side of the carriage component whereby the carriage component can pull the rod and sleeve in one linear direction but not in an opposite linear direction; and
a grommet disposed between the first opening in the frame and the rod in frictional contact with the rod for preventing the rod and sleeve to move with respect to the grommet unless the rod is pulled in said one linear direction by the carriage or pushed in the opposite linear direction.

6. The idler control apparatus for a cable conveyor system of claim 5 wherein the grommet is made of an elastomeric material.

7. The idler control apparatus for a cable conveyor system of claim 6 wherein the elastomeric material is rubber.

8. The idler control apparatus for a cable conveyor system of claim 6 wherein the elastomeric material is plastic.

\* \* \* \* \*